Sept. 4, 1951   M. J. WEBER, JR   2,566,390
SELF-PROPELLED ROCKET LAUNCHER
Filed Sept. 6, 1945
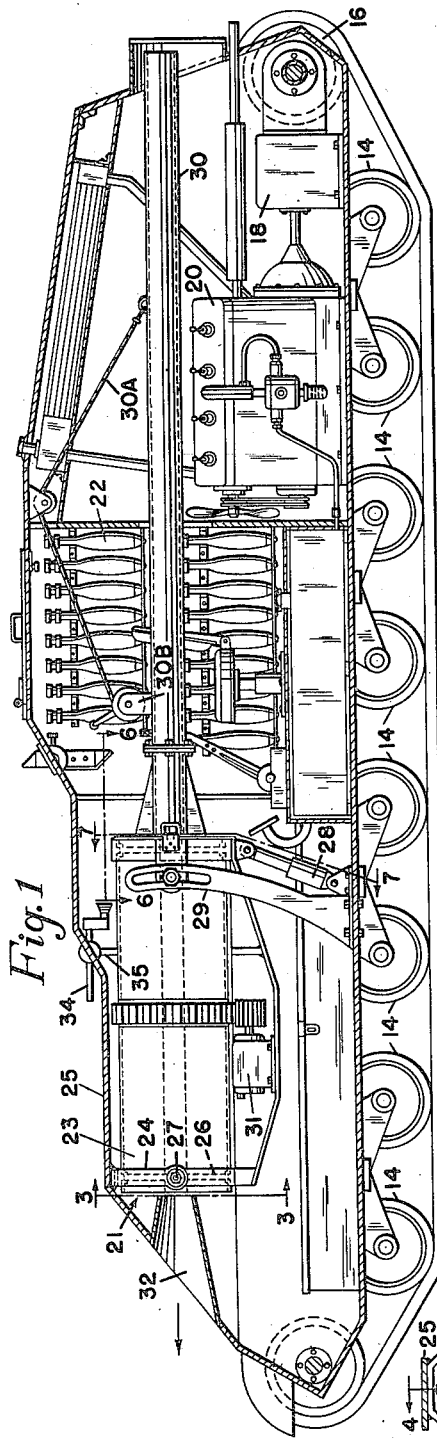
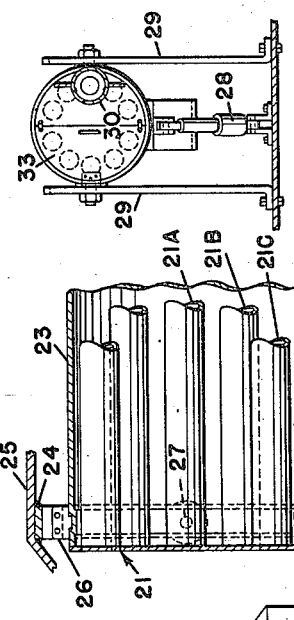
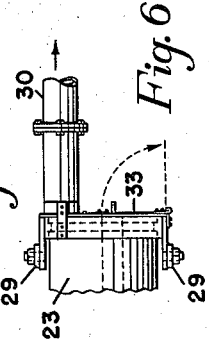
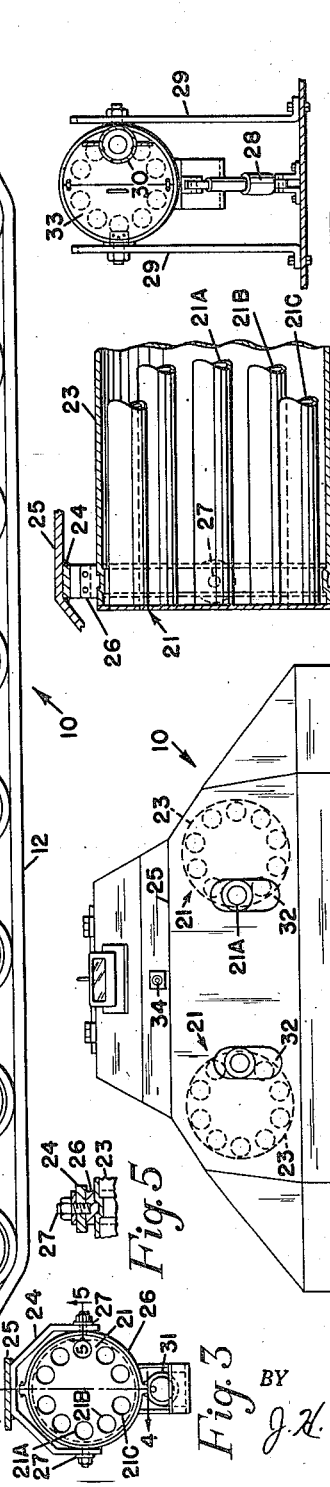
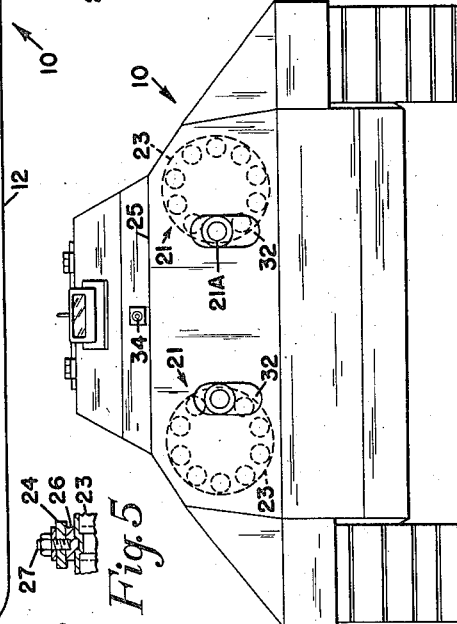
INVENTOR.
MATT J. WEBER, JR.
BY
J. H. Church & H. E. Thibodeau
ATTORNEYS Patented Sept. 4, 1951

2,566,390

UNITED STATES PATENT OFFICE 2,566,390

SELF-PROPELLED ROCKET LAUNCHER

Matt J. Weber, Jr., Chicago, Ill.

Application September 6, 1945, Serial No. 614,798

3 Claims. (Cl. 89—1.7)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a military combat vehicle, and more particularly to improvements in a self-propelled rocket launching armored vehicle of the tracklaying or tank type.

The effectiveness of rockets or similar jet propelled projectiles has become commonly known, and devices known as "rocket launchers" are in use for single and barrage fire. With a single tube some aiming is possible, but with a barrage type there is little or no individual control. Combat is often so fluid, however, that it is necessary to provide for rapid change of position as well as more accurate and more rapid fire than has heretofore been possible. Armored protection for the crew also results in a greater degree of effectiveness than would otherwise be possible.

The principal object of my invention is to provide suitable launching equipment for the rapid fire of a plurality of rockets, and more particularly to provide a novel vehicle having multiple rocket launching mechanism so that a highly mobile, adequately armored, and self propelled vehicle of high fire power is available.

A further object of my invention is to provide a vehicle of armored tracklaying characteristics with a plurality of revolving rocket launching tubes whereby continuous or intermittent and controlled fire can be accomplished.

Other and more specific objects of my invention will be apparent from the following description of a preferred form of embodiment taken in connection with the attached drawings illustrative thereof, and in which:

Figure 1 is a substantially central longitudinal vertical section of my rocket launcher;

Figure 2 is a front elevation of the launcher shown in Figure 1;

Figure 3 is a partial transverse vertical section on the line 3—3 of Figure 1, showing the end of the rocket barrel;

Figure 4 is a longitudinal partial vertical section on the line 4—4 of Figure 3;

Figure 5 is a horizontal longitudinal section through the barrel trunnion taken along the line 5—5 of Figure 3;

Figure 6 is a horizontal longitudinal section taken substantially along the line 6—6 of Figure 1, showing the loading end of the rocket barrel; and Figure 7 is a substantially vertical transverse section taken along the line 7—7 of Figure 1 to the rear of the rocket barrel, showing the elevating mechanism.

In accordance with the preferred form of embodiment of my invention, I have shown an armored vehicle 10 which may be generally of the tracklaying type, having the continuous track 12 passing continuously over the bogie suspension rollers 14 in the well known manner. The rear sprocket 16 may be driven as through the power train and final drive 18 from the motor 20. No attempt has been made to illustrate such elements in detail as they are merely representative of a self-propelled tracklaying, armored combat vehicle.

The principal feature of my invention resides in the mounting of one or more rocket guns generally indicated at 21, preferably of the multichamber type in the vehicle 10. The gun includes a plurality of cylinders for separate firing chambers 21a, 21b, 21c, et cetera, each of which is adapted to discharge a rocket generally indicated at 22, a supply of which is appropriately mounted within the hull of the vehicle 10. A shell 23 may be used to surround the firing chambers 21a, et cetera, such shell thus providing a chamber in which a cooling medium may be circulated in any suitable manner.

In order to provide for the elevation of the rocket gun 21, I prefer to mount the forward end on a suitable bracket 24, which may be suspended from the top of the vehicle body 25 as shown in Figure 3. A band or ring 26 surrounds the end of the rocket gun barrel 23 to permit the desired rotation and this ring is pivoted on the trunnions 27 to provide for the elevation and depression of the gun.

Elevation of the barrel is appropriately accomplished by the hydraulic mechanism 28 as shown in Figure 7 with the sides of the barrel suitably guided in brackets 29 having an arcuate path for movement. The tail pipe 30 of the rocket gun extends to the rear of the vehicle and projects through the back for the appropriate discharge of gases as is well known. A counterbalance device including a cable 30a and take-up 30b may be used on the long tube.

A motor 31 is mounted below the barrel of the rocket gun for the purpose of turning the barrel so that the appropriate chamber coincides with the tail pipe 30 as well as the discharge opening 32 mounted in the front of the hull of the vehicle. Suitable means will be provided, as is well known, to provide for the starting and stopping, and firing of the rockets, such electrical elements not being shown.

Loading of the respective chambers of the rocket gun may be accomplished effectively through the door 33 as shown in Figure 7; several chambers being exposed at once to accomplish rapid loading, if necessary.

The use of a multi-chamber barrel is of particular advantage not only in that continuous loading can be effected, but also that there is a time of cooling which permits the most effective use of the barrel.

It is further convenient to mount a plurality of rocket launching barrels on the respective sides of the tank or combat vehicle, and either or both may be fired depending upon the desired rate of firing and other combat conditions.

As previously mentioned, the hull of the vehicle is suitably provided with supports for a plurality of rockets and will also be provided with suitable ammunition and fuel chambers as well as with seats for the operator, operating controls, sighting devices, and the usual equipment necessary for a self-propelled vehicle. It may also be found desirable to mount a sighting scope 34 on the barrel of the gun for better control of its aim. This would be provided with suitable linkage 35 to accomplish the desired angular change with the barrel.

While I have shown and described a preferred form of embodiment of my invention, I am aware that modifications may be made thereto, and I therefore desire a broad interpretation of my invention within the scope and spirit of the description herein and of the claims appended hereafter.

What I claim is:

1. In an armored tracklaying vehicle with a hull having therein a front rocket discharge opening and a rear rocket gas discharge opening, a rocket gun comprising a tail pipe for exhausting rocket gases at one end thereof through said rear opening, a barrel having a plurality of separate rocket firing chambers extending longitudinally therethrough, connecting means on the other end of said tail pipe and one end of said barrel providing for relative rotation of the latter about its longitudinal axis, each of said firing chambers being successively alignable with said tail pipe upon said rotation, a counterbalance device attached to said tail pipe for counterbalancing the latter from and within said hull, pivoted mounting means on the other end of said barrel and pivotally supportable from said hull adjacent said front opening therein for pivotally supporting said barrel at said other end thereof for rotation about its longitudinal axis, said mounting means providing for pivotal elevation of said barrel and for successive firing position alignment of each of said firing chambers with both said front opening and said tail pipe upon said rotation, and electrical means for controllably rotating said barrel for said successive firing position alignment.

2. In an armored self-propelled vehicle with a hull having therein a front rocket discharge opening and a rear rocket gas discharge opening, a rocket gun comprising a tail pipe for exhausting rocket gases from one end thereof through said rear opening, a barrel having a plurality of separate rocket firing chambers extending longitudinally therethrough, connecting means on the other end of said tail pipe and one end of said barrel providing for relative rotation of the latter about its longitudinal axis, each of said firing chambers being successively alignable with said tail pipe upon said rotation, a counterbalance device attached to said tail pipe for counterbalancing the latter from and within said hull, pivoted mounting means on the other end of said barrel and pivotally supportable from said hull adjacent said front opening therein for pivotally supporting said barrel at said other end thereof for rotation about its longitudinal axis, said mounting means providing for pivotal elevation of said barrel and for successive firing position alignment of each of said firing chambers with both said front opening and said tail pipe upon said rotation, means supportable within said hull for controllably rotating said barrel for said successive firing position alignment, and elevating means operatively connected to said one end of said barrel for pivotal elevation of the latter.

3. In an armored self-propelled vehicle with a hull having therein a front rocket discharge opening and a rear rocket gas discharge opening, a rocket gun comprising a tail pipe for exhausting rocket gases from one end thereof through said rear opening, a barrel having a plurality of separate rocket firing chambers extending longitudinally therethrough, connecting means on the other end of said tail pipe and one end of said barrel providing for relative rotation of the latter about its longitudinal axis, each of said firing chambers being successively alignable with said tail pipe upon said rotation, a counterbalance device attached to said tail pipe for counterbalancing the latter from and within said hull, a bracket support member attachable to said hull within the latter adjacent said front opening therein, a band surrounding said barrel on the other end thereof and pivotally connected to said bracket to permit pivotal elevation of said barrel, said band permitting rotation therein of said barrel about its longitudinal axis, said band and bracket support member providing for successive firing position alignment of each of said firing chambers with both said front opening and said tail pipe upon said rotation, means supportable within said hull for controllably rotating said barrel for said successive firing position alignment, and elevating mechanism supportable within said hull and operatively connected to said one end of said barrel for pivotal elevation of the latter.

MATT J. WEBER, JR.

REFERENCES CITED

The following references are of record in the file of this patent:

UNITED STATES PATENTS

| Number | Name | Date |
|---|---|---|
| 281,643 | Preusser | July 17, 1883 |
| 861,467 | Jusselin | July 20, 1907 |
| 1,183,050 | Voller et al. | May 16, 1916 |
| 1,215,255 | Davison | Feb. 6, 1917 |
| 1,373,381 | Cooke | Mar. 29, 1921 |
| 1,398,085 | Ball | Nov. 22, 1921 |
| 1,603,099 | Wright | Oct. 12, 1926 |
| 2,380,024 | Chandler | July 10, 1945 |
| 2,389,579 | Reynolds | Nov. 20, 1945 |
| 2,390,688 | Bradbery | Dec. 11, 1945 |
| 2,440,723 | MacDonald | May 4, 1948 |

FOREIGN PATENTS

| Number | Country | Date |
|---|---|---|
| 125,126 | Great Britain | Apr. 17, 1919 |

OTHER REFERENCES

Popular Mechanics, October 1942, page 45.
"Coast Artillery Journal," July-Aug. 1943, page 42.